United States Patent [19]

White

[11] Patent Number: 4,986,905
[45] Date of Patent: Jan. 22, 1991

[54] DISTRIBUTION CONTROL SYSTEM FOR RECYCLING TREATED SEWAGE WATER FOR IRRIGATION

[76] Inventor: Rocky R. White, 1201 Oak Rd., Lilburn, Ga. 30247

[21] Appl. No.: 369,651

[22] Filed: Jun. 21, 1989

[51] Int. Cl.$^5$ .................... C02F 9/00; E02B 11/00; B05B 15/00
[52] U.S. Cl. .................... 210/104; 210/108; 210/195.1; 210/258; 210/532.2; 239/542; 405/37; 405/51
[58] Field of Search ............. 210/86, 102, 104, 108, 210/170, 195.1, 258, 416.1, 532.2, 419; 405/36, 37, 51, 52; 239/542

[56] References Cited

U.S. PATENT DOCUMENTS

| 625,605 | 3/1906 | Ridgway | 137/126 |
|---|---|---|---|
| 2,578,981 | 12/1951 | Parker | 405/37 |
| 2,768,028 | 10/1956 | Robinson | 405/37 |
| 2,786,418 | 3/1957 | Peck | 405/37 |
| 3,724,664 | 4/1973 | Lemberger et al. | 210/104 |
| 3,764,011 | 10/1973 | Owens | 210/192 |
| 3,844,946 | 10/1974 | Farrell, Jr. | 210/104 |
| 3,878,101 | 4/1975 | Kennedy | 210/202 |
| 3,902,825 | 9/1975 | Quillen | 405/37 |
| 3,910,500 | 10/1975 | Hardison | 239/542 |
| 3,920,550 | 11/1975 | Farrell, Jr. et al. | 210/86 |
| 3,933,641 | 1/1976 | Hadden et al. | 210/258 |
| 3,961,753 | 6/1976 | Sears | 239/542 |
| 3,976,250 | 8/1976 | Bentzinger | 239/542 |
| 4,042,497 | 8/1977 | Maltby | 210/104 |
| 4,070,292 | 1/1978 | Adams | 210/195.1 |
| 4,120,312 | 10/1978 | Michael | 137/236.1 |
| 4,123,358 | 10/1978 | Flagge | 210/104 |
| 4,139,471 | 2/1979 | Foti | 210/170 |
| 4,211,654 | 7/1980 | Weber et al. | 210/104 |
| 4,230,578 | 10/1980 | Culp et al. | 210/104 |
| 4,430,020 | 2/1984 | Robbins | 405/36 |
| 4,538,377 | 9/1985 | Thornton | 405/51 |
| 4,664,795 | 5/1987 | Stegall | 210/532.2 |
| 4,704,047 | 11/1987 | Oldfelt et al. | 405/37 |
| 4,818,384 | 4/1989 | Mayer | 210/195.1 |
| 4,895,645 | 1/1990 | Zorich | 210/195.1 |

OTHER PUBLICATIONS

MD-1, Inc., Mo-Dad-1, Inc., "Individual Home Sewage Treatment Systems" date unknown.
"The Secret to Beautiful Landscapes: Netofim Drip Irrigation Systems," Netatin Irrigation, Inc., date unknown.
RAM Multi-Seasonal Pressure Compensating Dripperline, Netofim Irrigation, Inc., date unknown.

Primary Examiner—Richard V. Fisher
Assistant Examiner—Joseph Drodge

[57] ABSTRACT

The present invention is a self-contained residential and commercial treatment system which is capable of purifying waste water and then distributing the purified water by means of a sprinkler system or a drip feed irrigation system or of recycling the purified water in some manner.

9 Claims, 22 Drawing Sheets

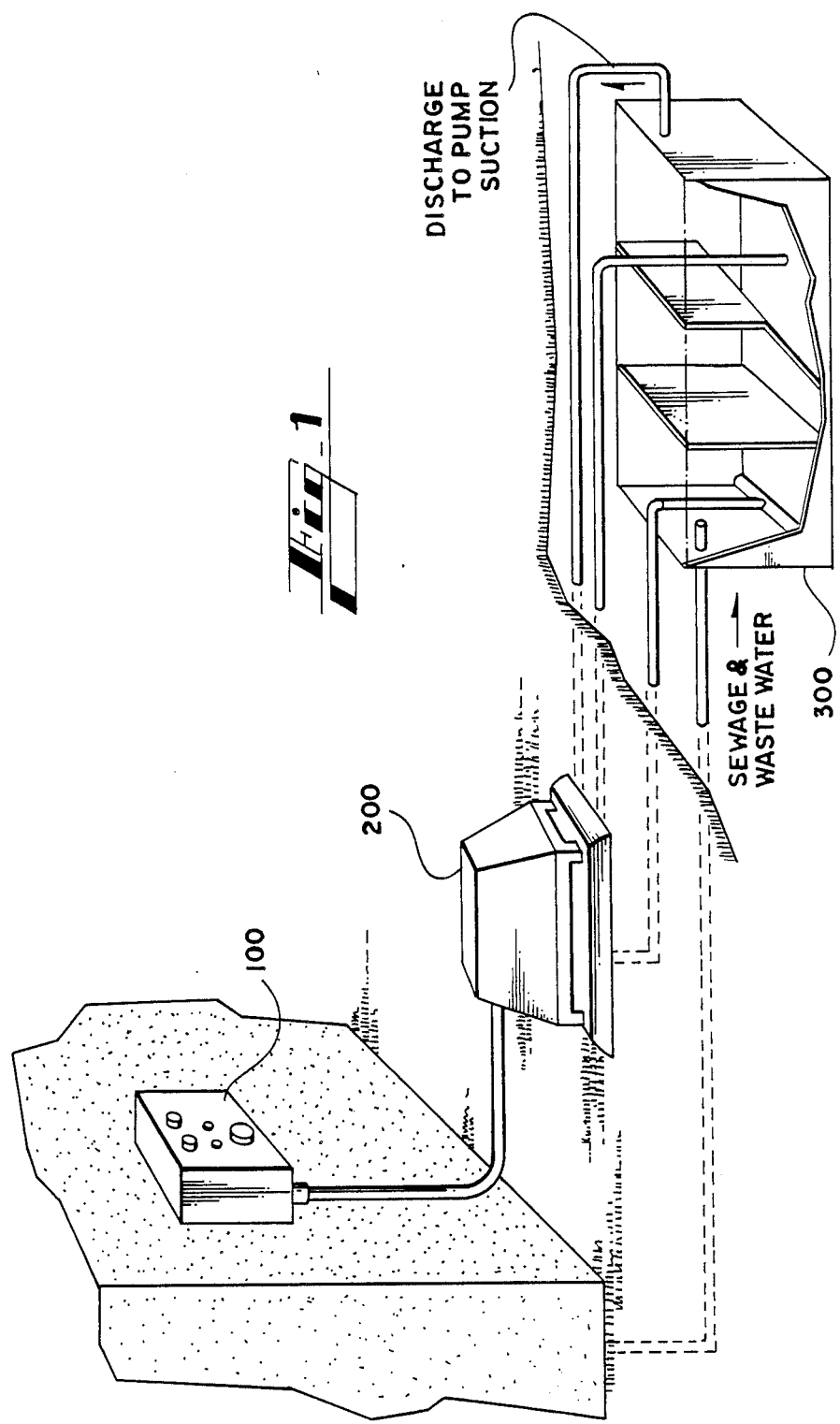

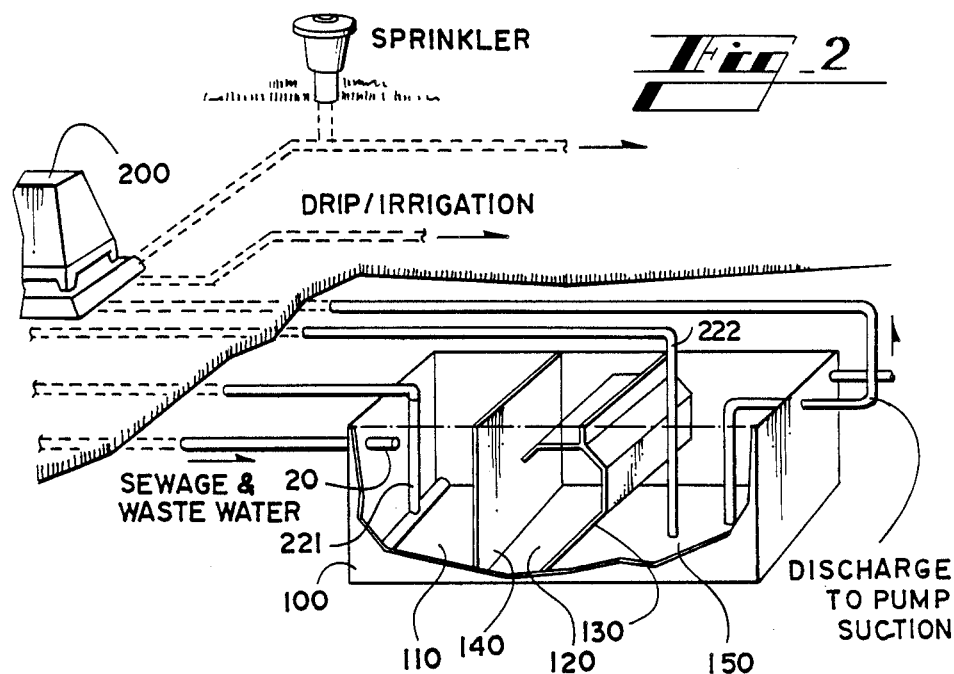
Fig_2
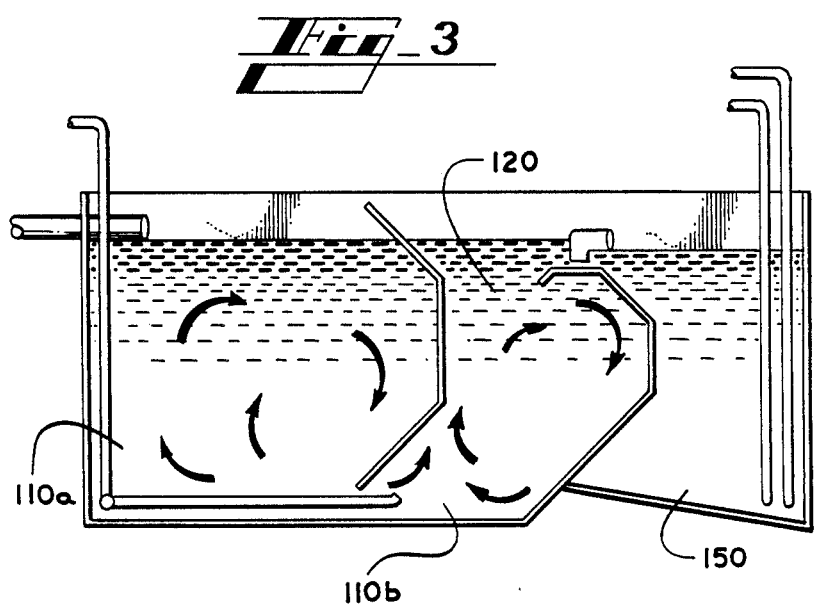
Fig_3

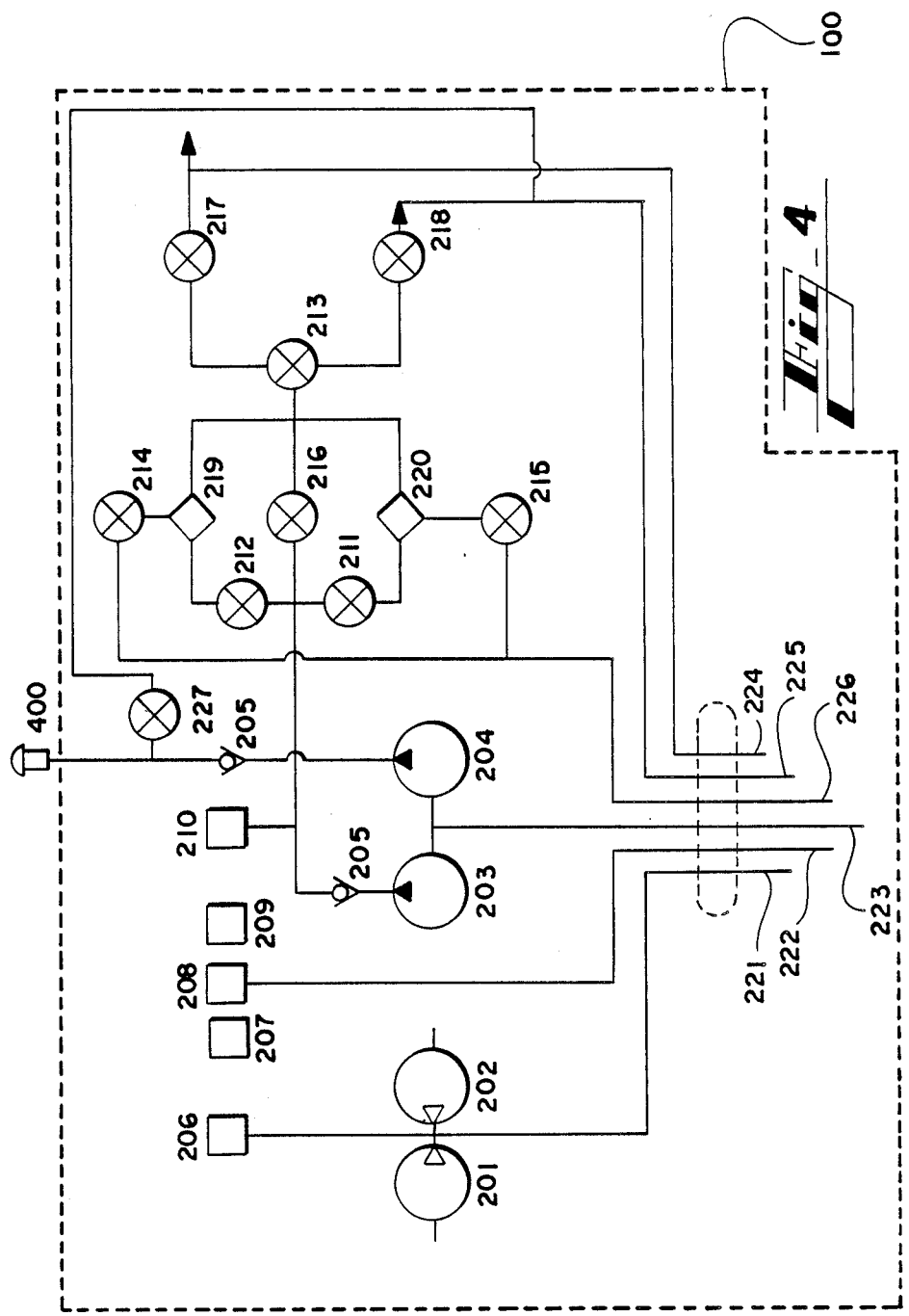
Fig_4

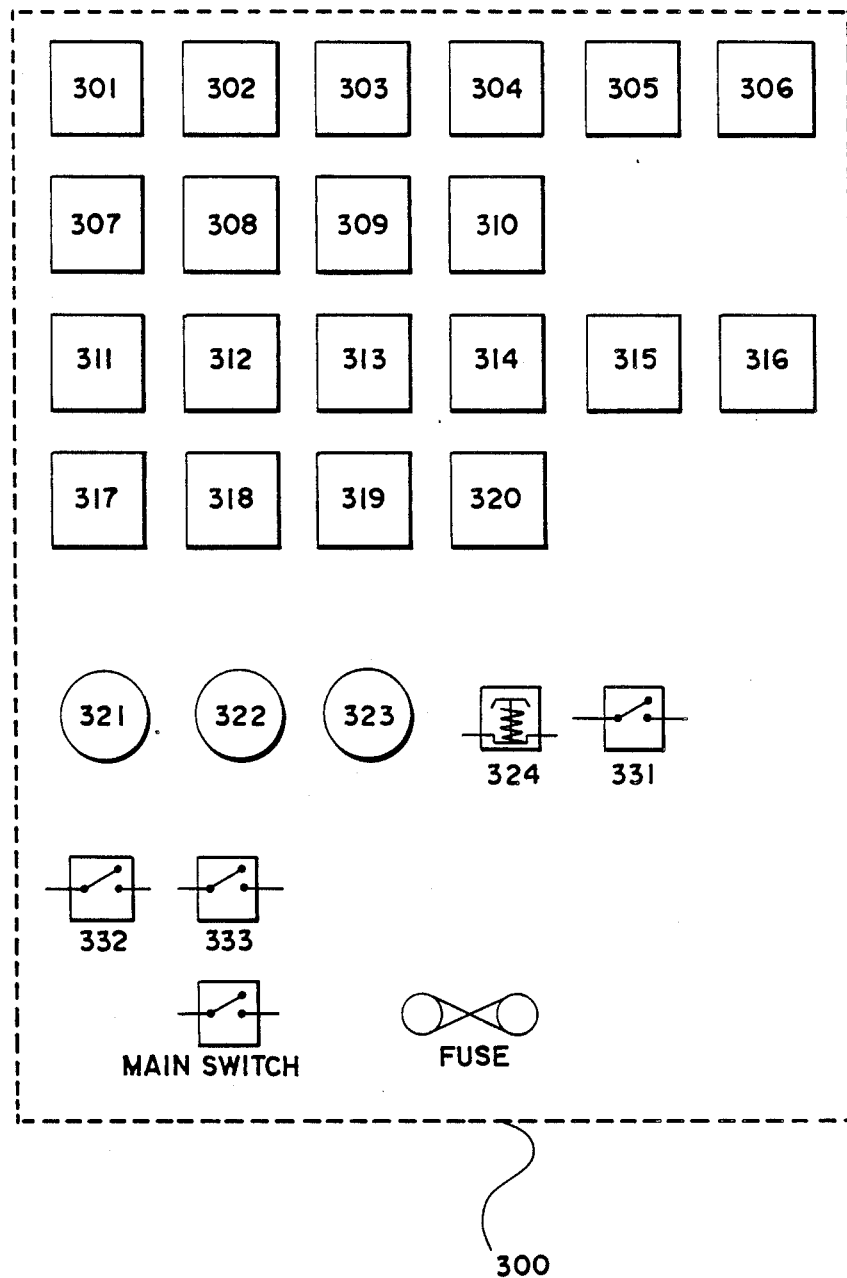
Fig_5

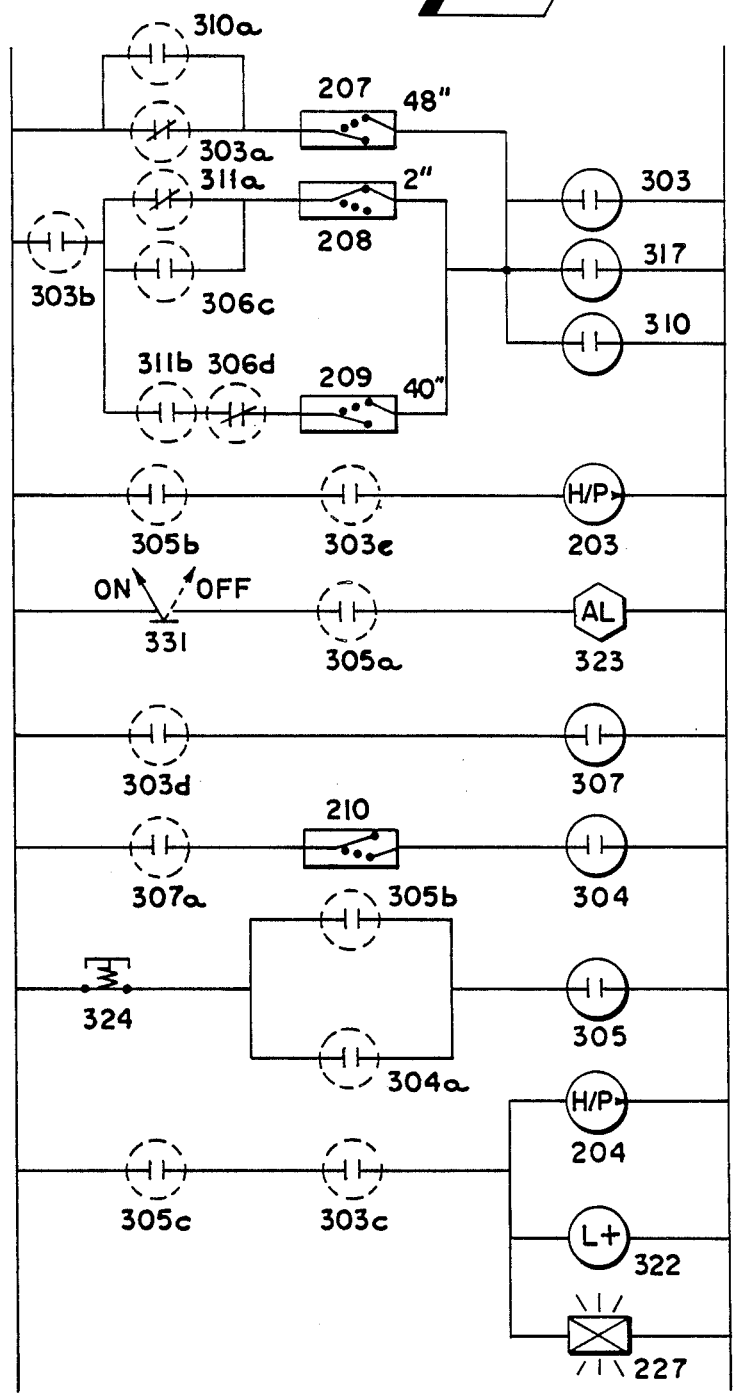
Fig_9

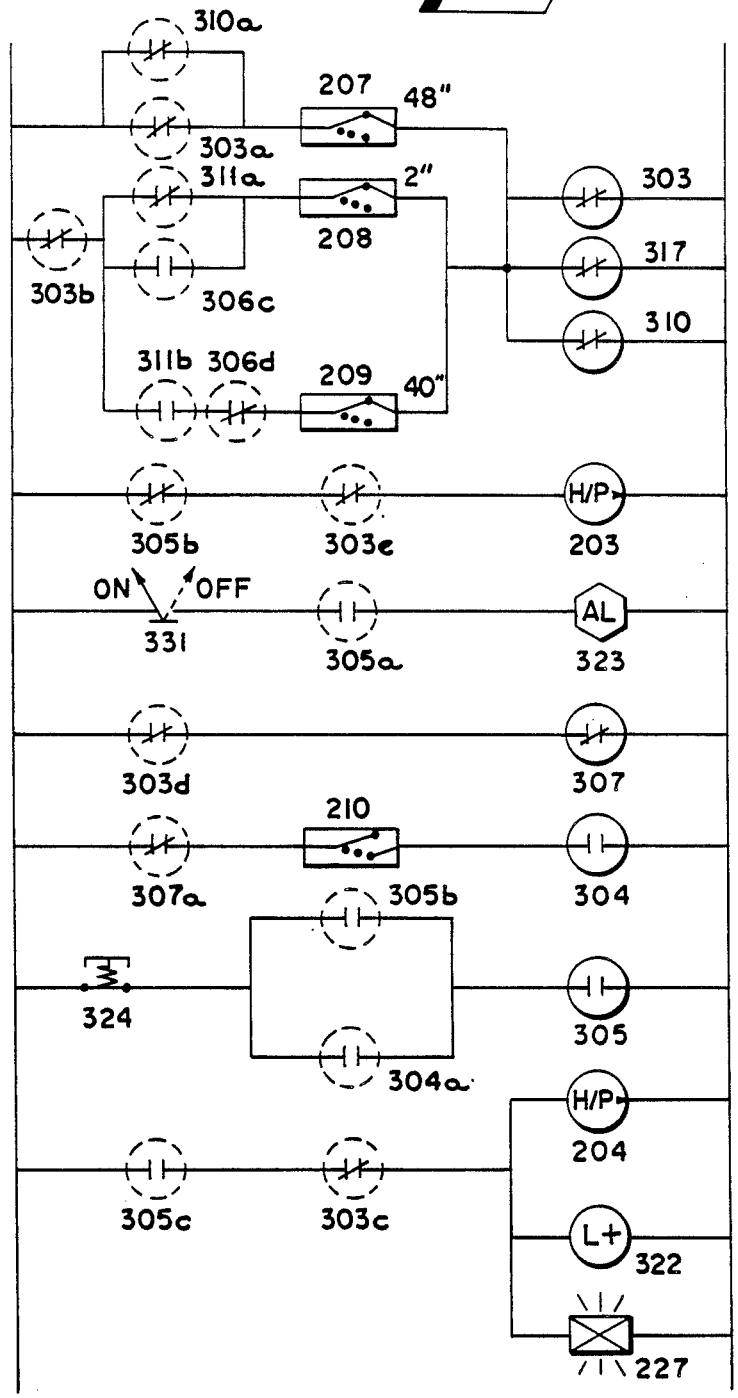
Fig_10

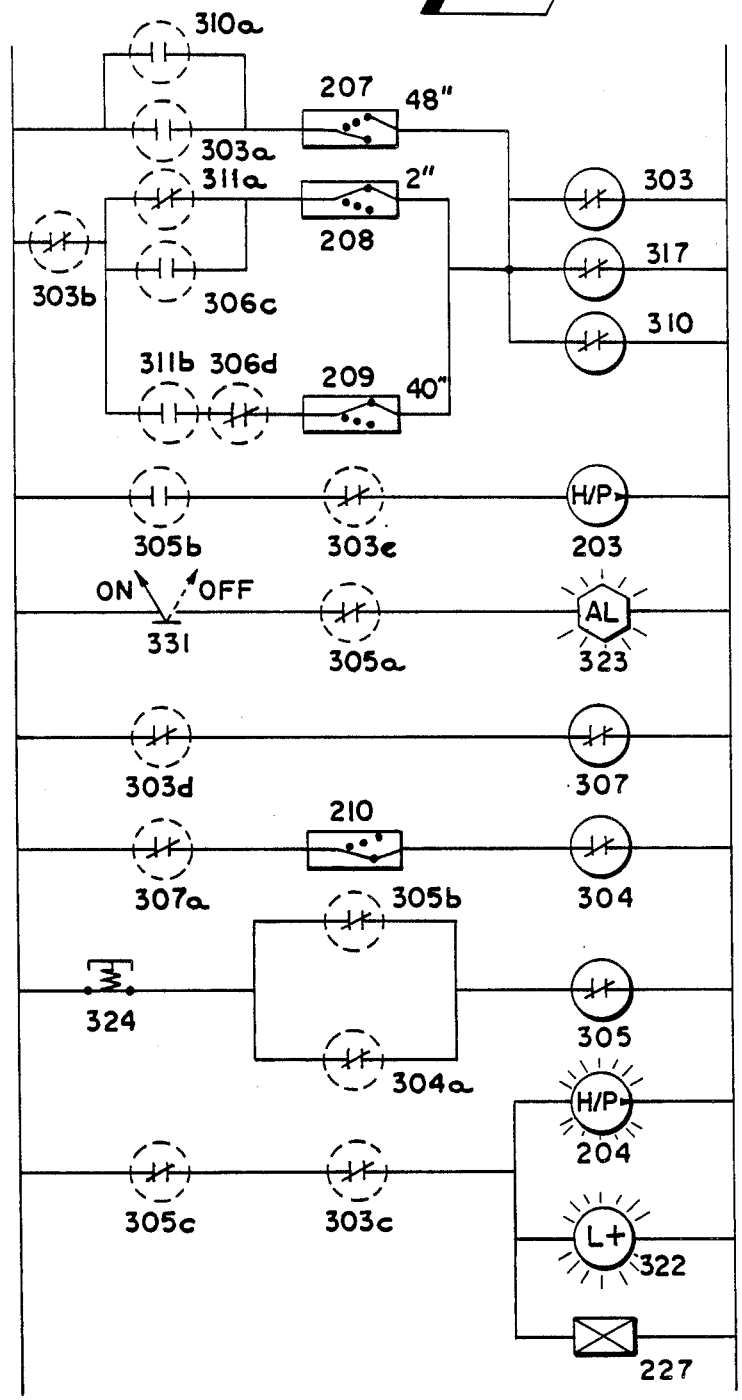
Fig_11

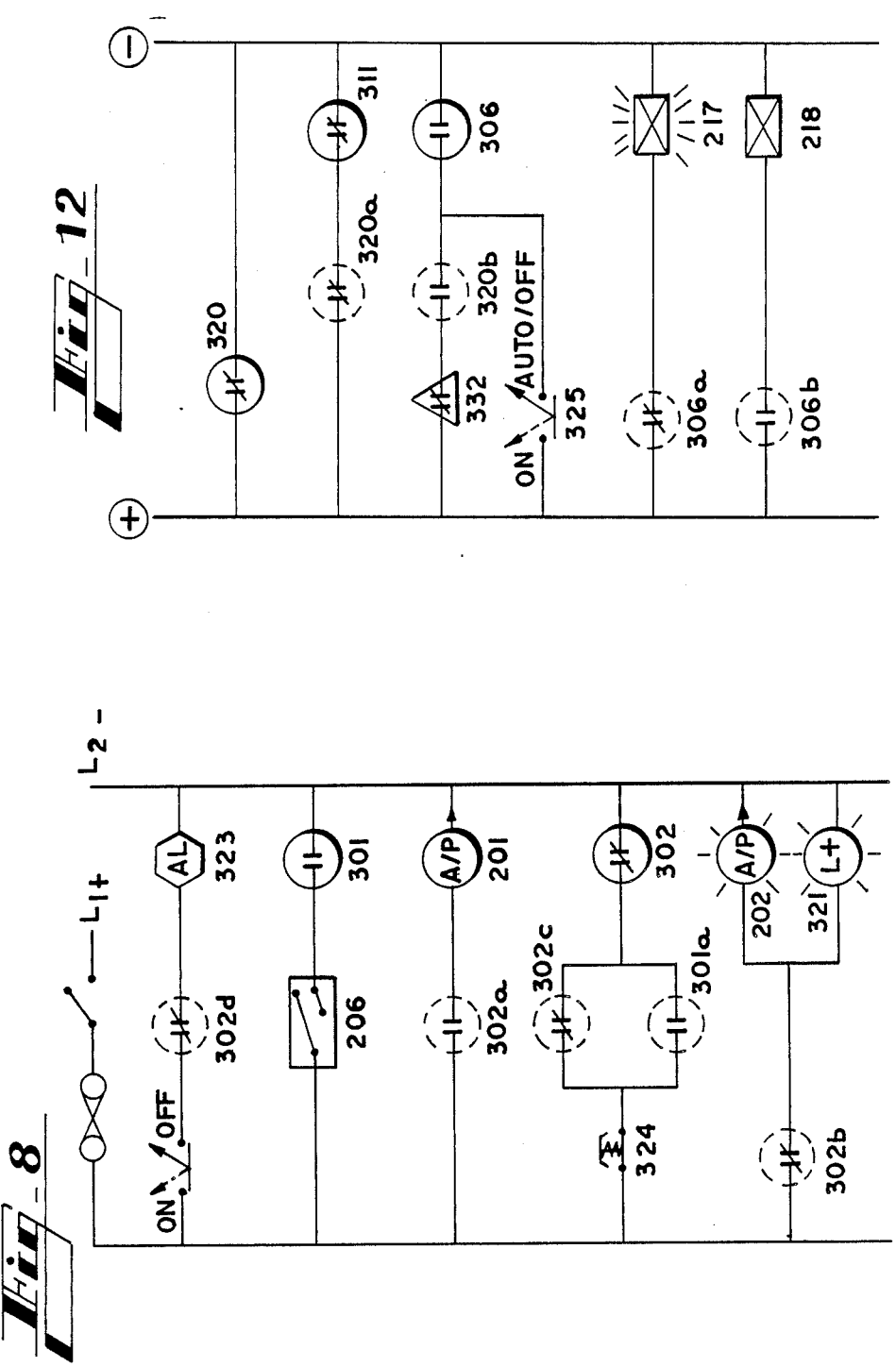

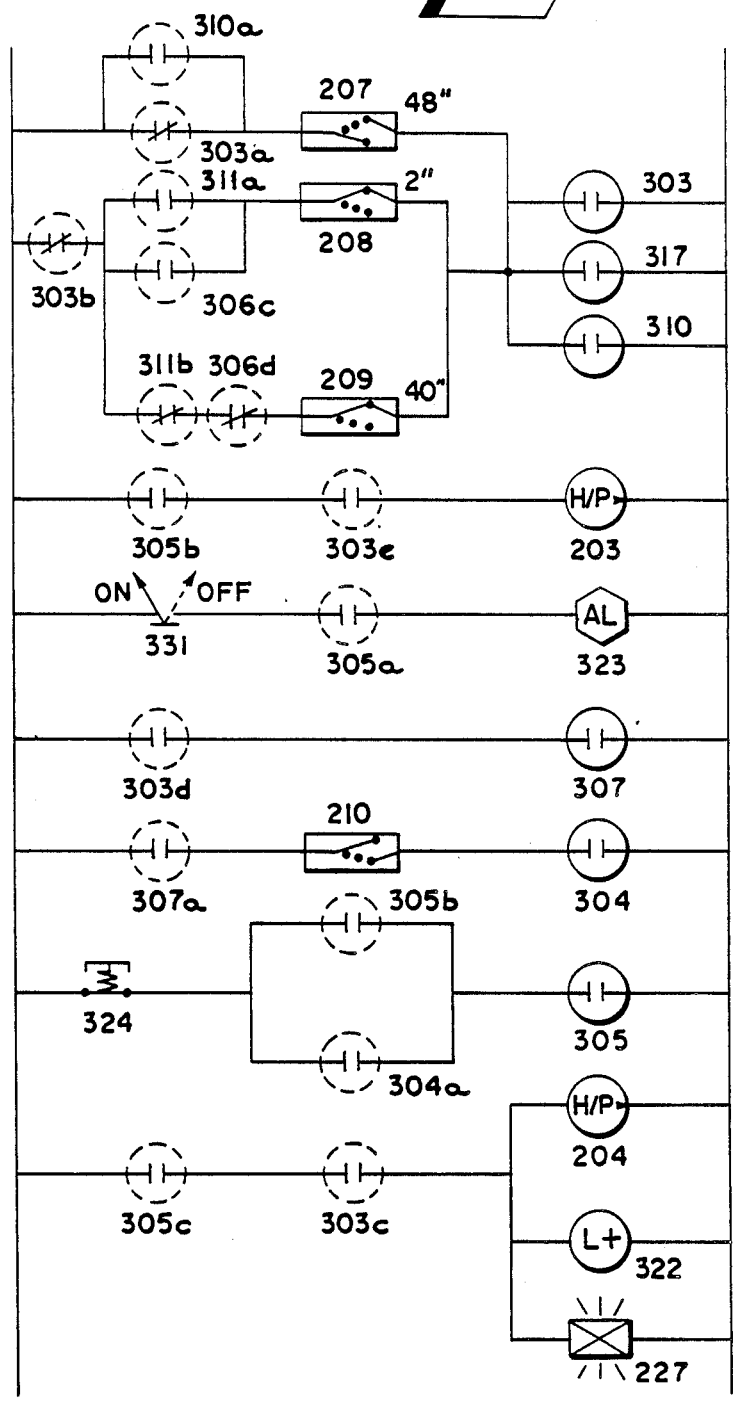
Fig_13

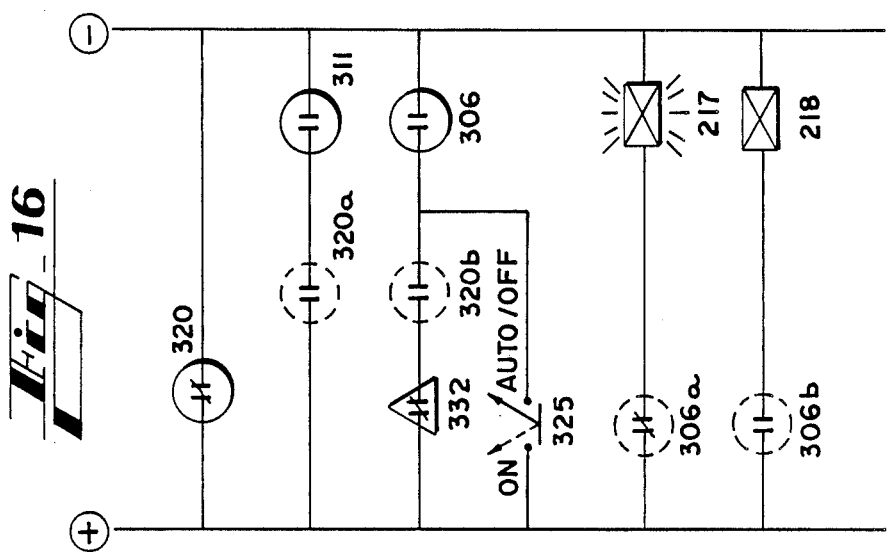
Fig_16
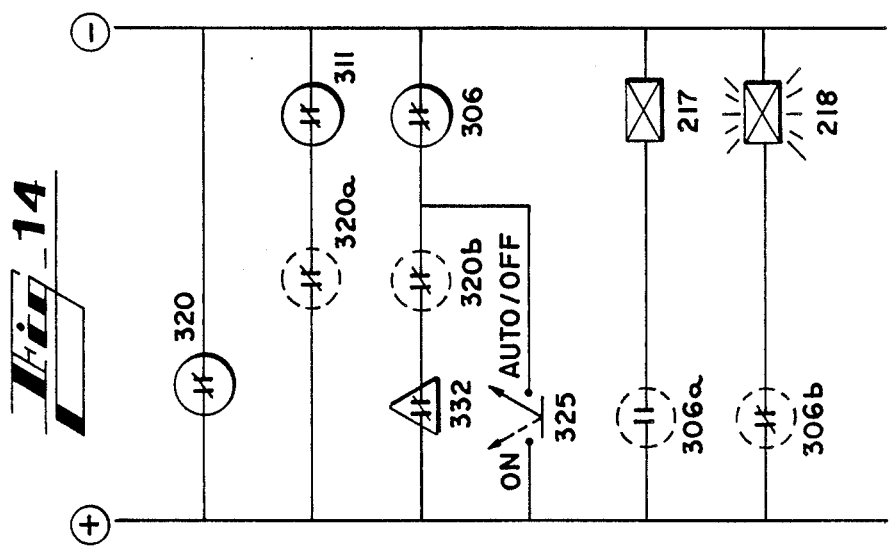
Fig_14

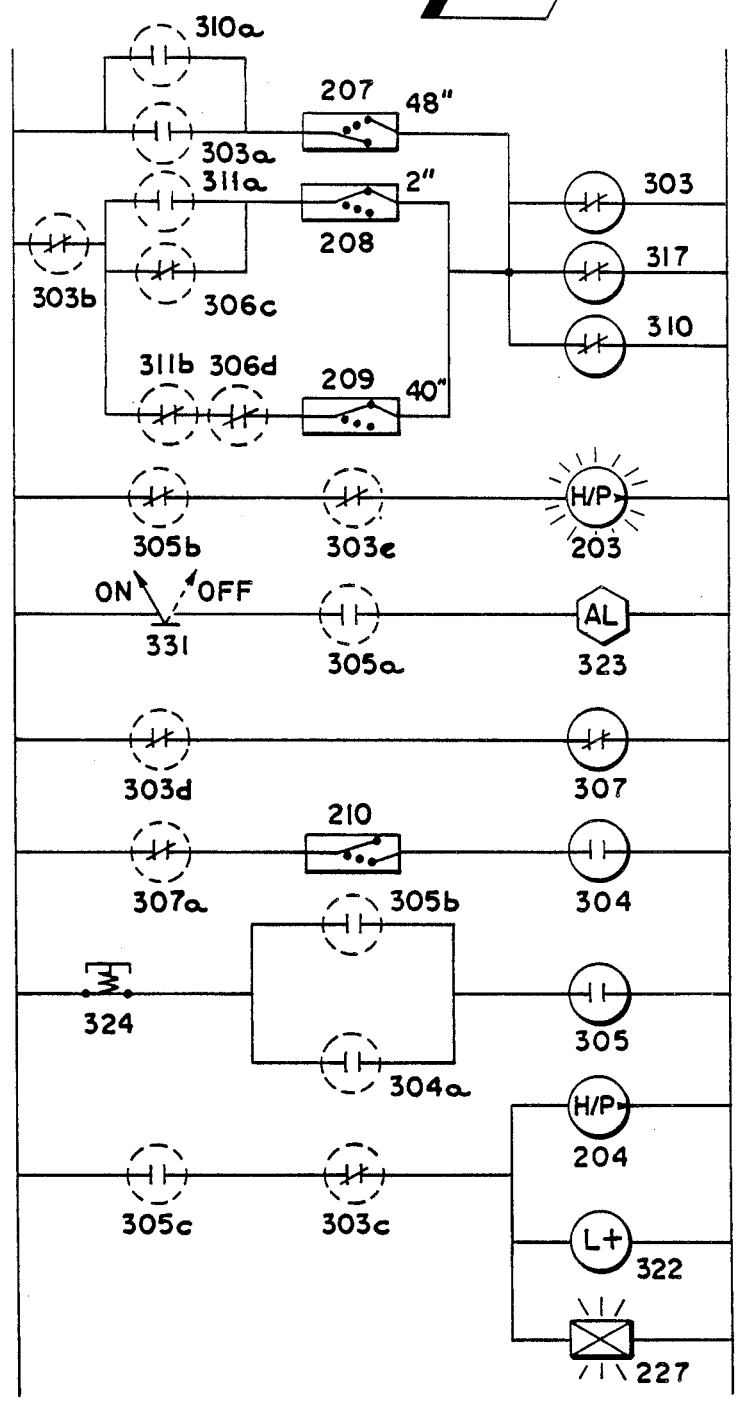
Fig_15

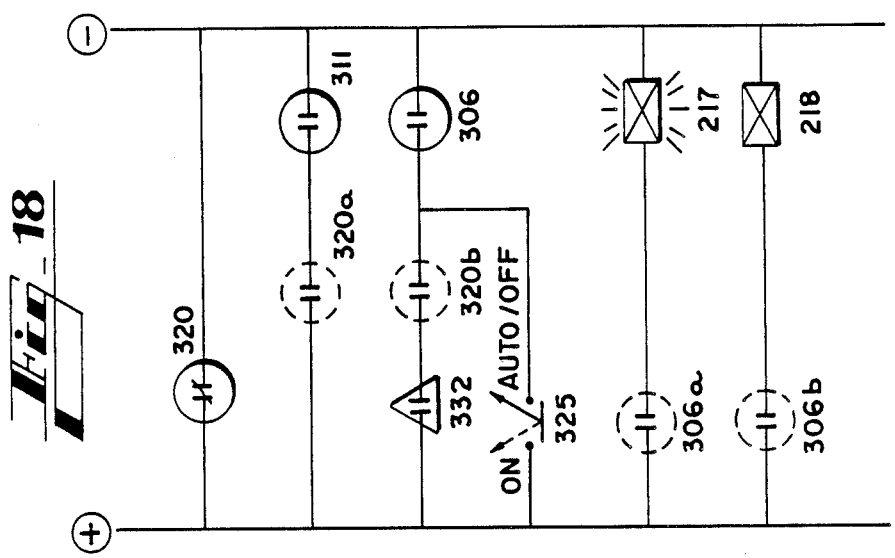
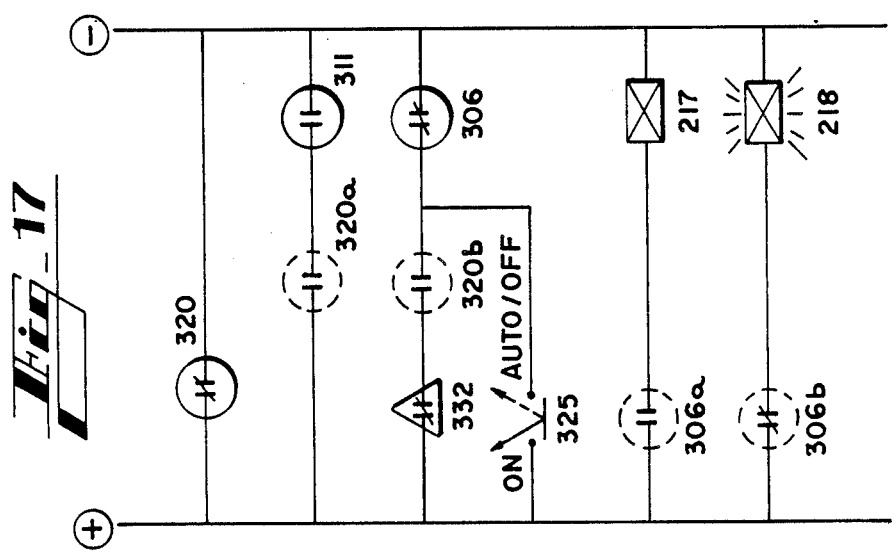

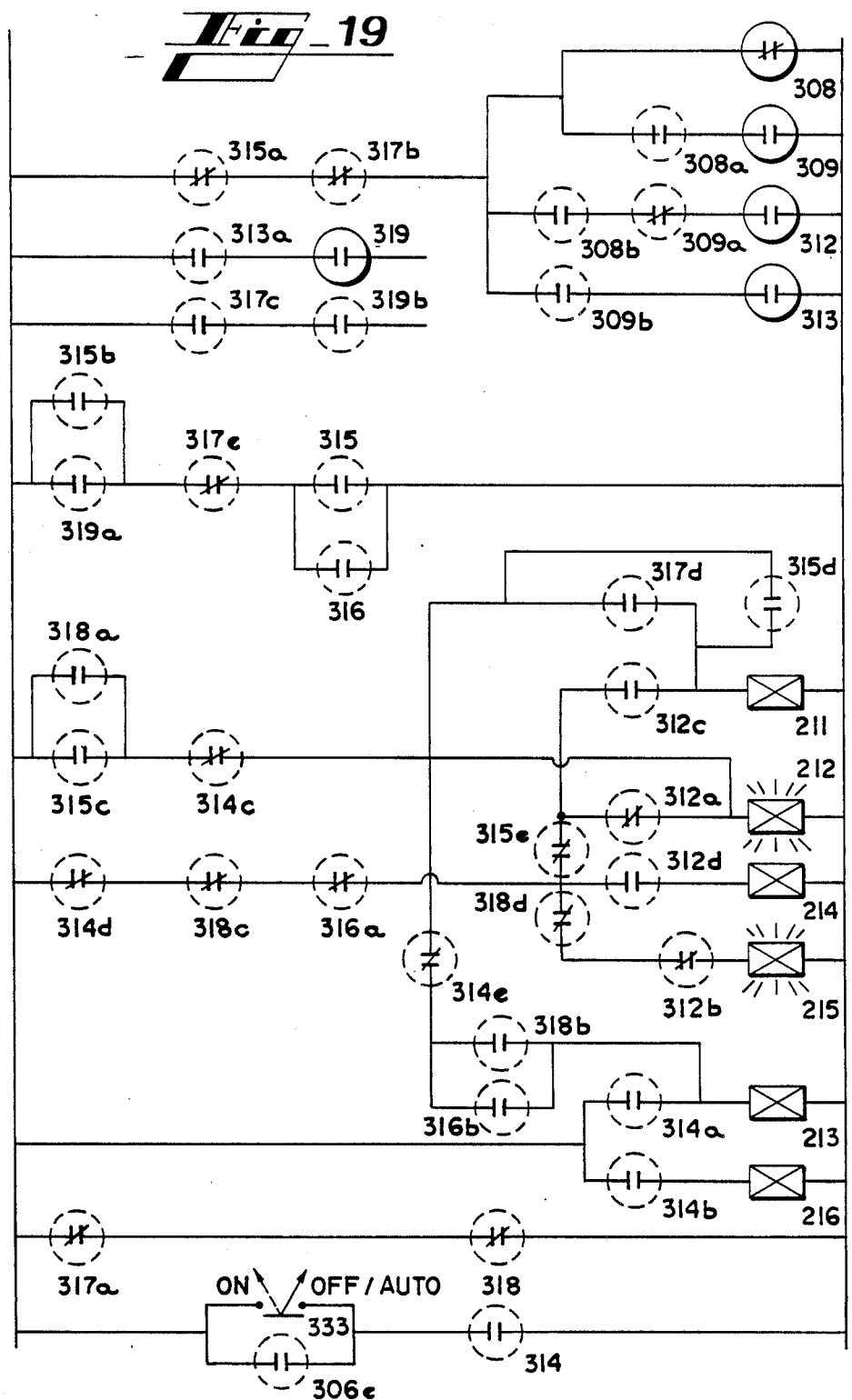

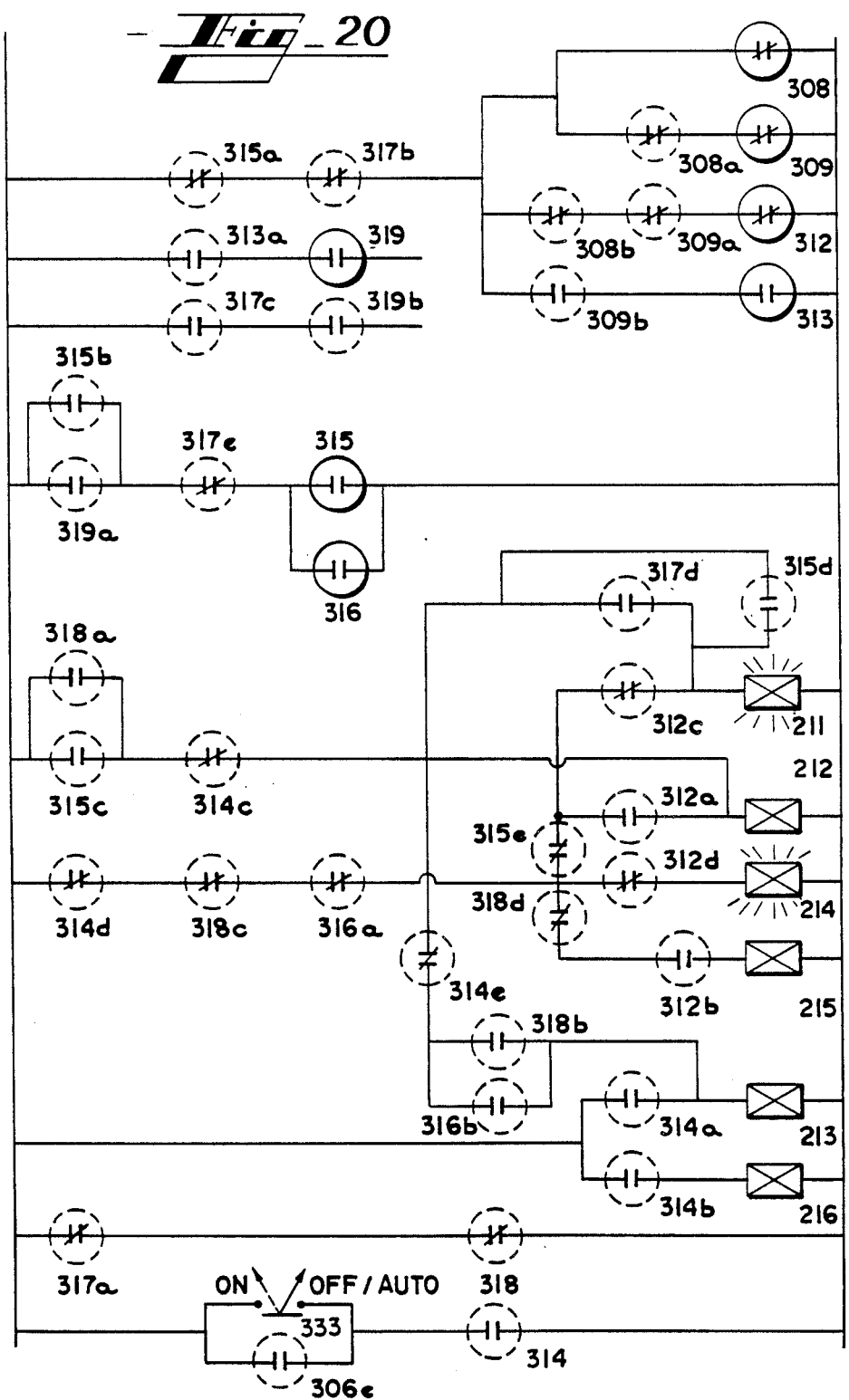
Fig_20

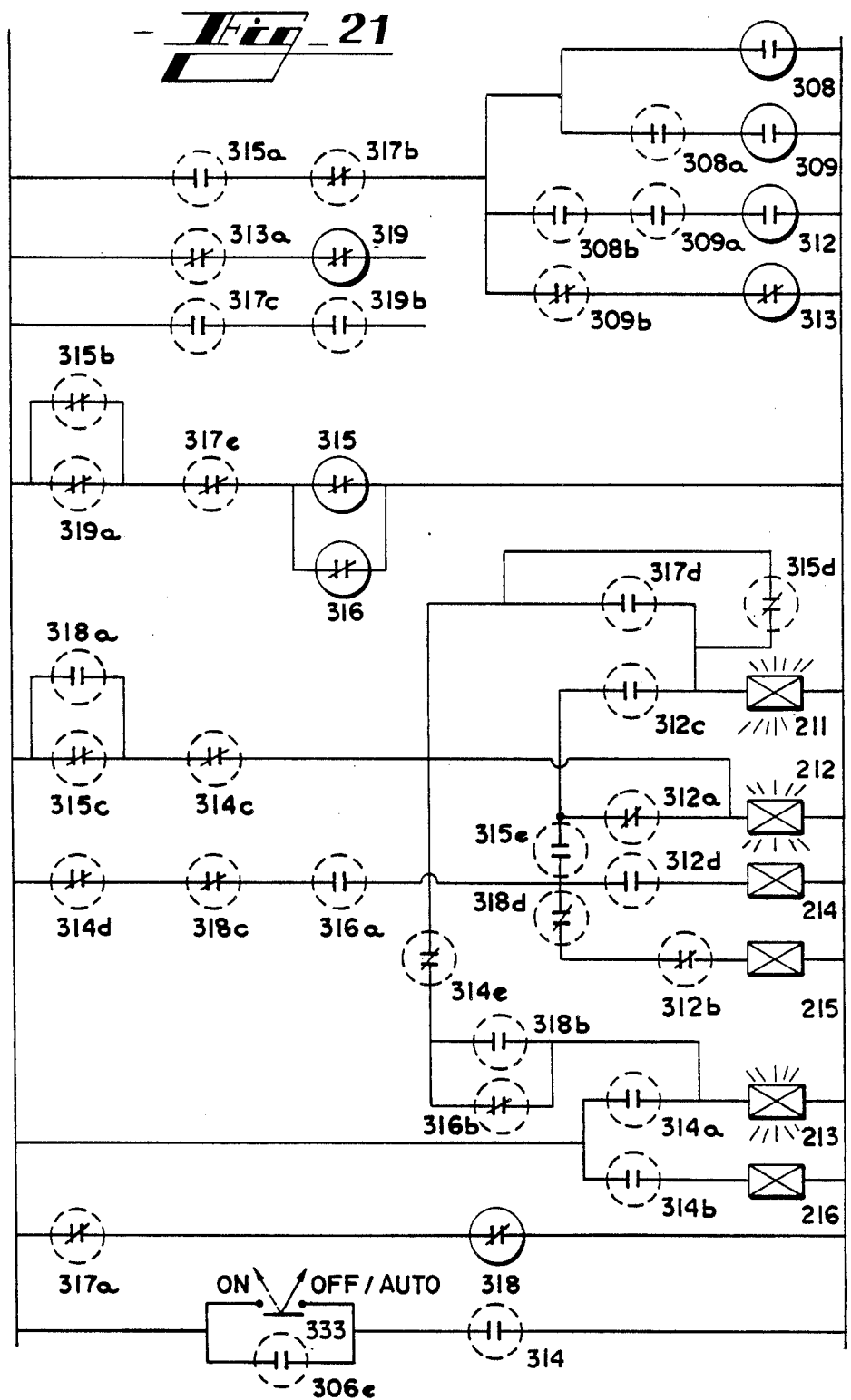
Fig_21

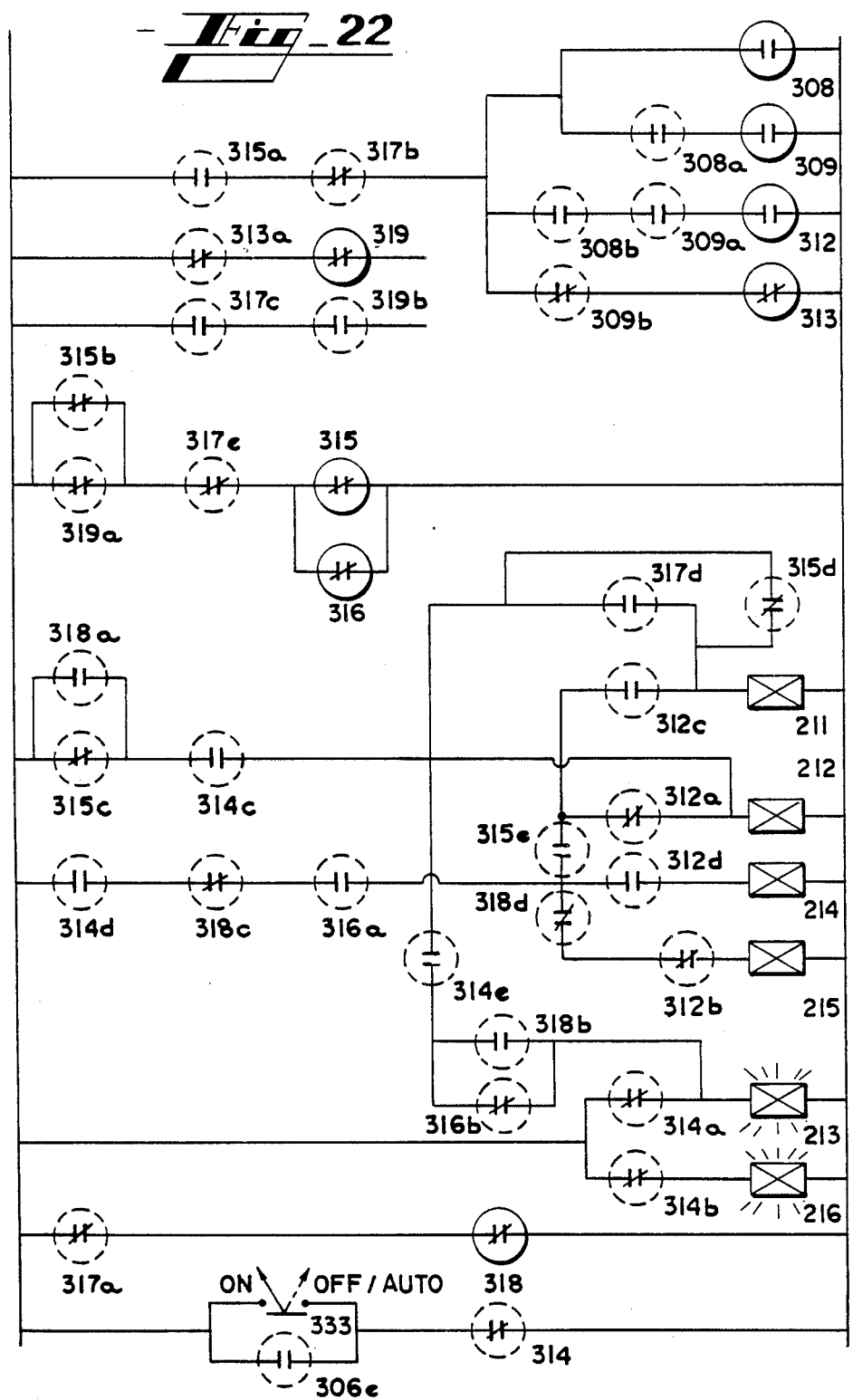
Fig_22

DISTRIBUTION CONTROL SYSTEM FOR RECYCLING TREATED SEWAGE WATER FOR IRRIGATION

BACKGROUND OF THE INVENTION

Historically, the problem of how to safely, conveniently and inexpensively dispose of sewage and sewage-contaminated water has plagued society. Although sewage disposal methods have evolved over time, the current methods of either installing septic tanks or hooking into a main sewer line have many drawbacks.

The current use of septic tanks is unwise from an environmental point of view. First of all, rather than being recycled and reused in some productive manner, the waste water flowing from septic tanks is currently disposed of by means of underground septic tank lines. In many instances, this septic tank waste water contaminates ground water and local lakes and streams thereby making drinking water unsafe and endangering aquatic plant and animal life. Secondly, under drought conditions, the failure to recycle septic tank waste water often means that grass, flowers, trees, bushes and other plant life die needlessly. Thirdly, in the process of installing septic tank lines and sewer lines, it is usually necessary to destroy large areas of vegetation.

From an economic standpoint, the failure to recycle septic tank waste water means that uncontaminated water becomes a more expensive commodity than it otherwise would be. Additionally, the shortcomings of the current septic tanks increase consumer demand for expensive sewage treatment plants. This, in turn, increases local taxes and water bills.

Another major drawback of the current methods of sewage disposal is that they are often inoperable on many remote land lots. For instance, land lots which cannot be hooked into city or county sewer lines, often have physical qualities, such as steep grades, rocky terrain or high water tables, which make the use of septic tanks impossible. Accordingly, such land lots are often deemed unusable.

A further major drawback of the current methods of sewage disposal is that even if the topography of a particular land lot will accommodate the installation of a septic tank, the size of that land lot must be kept relatively large since the current septic tanks require a large area of land in which to drain.

SUMMARY OF THE INVENTION

The present invention is a self-contained, residential and commercial treatment system which is capable of purifying waste water and then distributing the purified water by means of a sprinkler system or a drip feed irrigation system or of recycling the purified water in some manner.

It is a further object of the present invention to prevent the contamination of ground water by septic tank discharge.

An additional objective of the present invention is to provide a means in which to recycle and reuse waste water.

A further objective of the present invention is to provide a sprinkling system which will reduce the loss of plant life during drought conditions.

Another objective of the present invention is to diminish the destruction of trees and other plant life caused by the installation of septic tank lines and sewer lines.

It is a further object of the present invention to prevent the pollution of local lakes and streams by septic tank discharge.

Another objective of the present invention is to enable builders to make use of land lots having a high water table.

A further objective of the present invention is to enable builders to use land lots consisting of a high percentage of rock.

An additional objective of the present invention is to enable builders to make use of land lots having grades which are too steep to accommodate septic tanks.

Another objective of the present invention is to allow developers to decrease land lot sizes below the current septic tank lot sizes (at least 18,000 square feet) down to sewer lot sizes (usually 12,000 square feet and less).

A further objective of the present invention is to decrease the need for costly sewer treatment plants thereby decreasing taxes for local residents.

An additional objective of the present invention is to provide a system which can be modified in size so as to handle the waste water demands of one or more houses, condominiums, cluster homes, or the like.

Another objective of the present invention is to provide a system which can accommodate the waste water from apartment complexes or office complexes and will allow these complexes to recycle the waste water and use it to water large grassy areas and the like.

An additional objective of the present invention is to provide a system which can be attached to temporary structures, such as temporary residences, temporary offices, portable toilets, and construction trailers.

A further objective of the present invention is to provide a system which will allow dairy farmers to wash out their barns and reuse the water.

Another objective of the present invention is to provide a system which will allow plant nurseries to recapture condensation and reuse it for watering plants.

A further objective of the present invention is to provide a sewage system which can be used by campers.

An additional objective of the present invention is to provide hotels, motels, shopping centers and the like with a system which can both accommodate their waste water and irrigate plant areas both inside and out of the complex.

Another objective of the present system is to provide a system which can be used by trailer parks to reuse the water from an entire park.

A further objective of the present invention is to provide a system which can, in areas where this is allowed, pump clarified water back into toilet facilities after a chlorine injector has been added.

An additional object of the present invention is to provide a system which can recycle water used in car washes.

Another object of the present invention is to provide a system which can be used by ships, house boats, and the like to purify waste water before discharging it into the ocean.

The foregoing objectives and still further objectives of the present invention will become apparent from the consideration of the following Description of a Preferred Embodiment, and consideration of the attached Drawings in which the numbered parts described in the Description of a Preferred Embodiment are shown by like numbered parts in the accompanying drawings.

DESCRIPTION OF THE DRAWINGS

FIG. 1 is a perspective view of the residential and commercial treatment system.

FIG. 2 is a perspective view of one preferred embodiment of the underground sewage tank.

FIG. 3 is a perspective view of a second preferred embodiment of the underground sewage tank.

FIG. 4 is a schematic representation of the various components located inside the pump unit.

FIG. 5 is a schematic representation of the various components located inside the control box.

FIG. 8 is a schematic diagram of what occurs when air pressure builds back up after an air pump malfunction.

FIG. 9 is a schematic diagram of an hydraulic pump at rest.

FIG. 10 is a schematic diagram of an hydraulic pump during normal pumping operations.

FIG. 11 is a schematic diagram of a malfunctioning hydraulic pump.

FIG. 12 is a schematic representation of the sprinkler and drip control system between the hours of 6:00 p.m. and 5:00 a.m.

FIG. 13 is a schematic representation of the sprinkler and drip control systems during 6:00 p.m. and 5:00 a.m.

FIG. 14 is a schematic diagram of the sprinkler and drip control systems during 5:00 a.m. and 6:00 a.m.

FIG. 15 is a schematic representation of the sprinkler and drip control systems during 5:00 a.m. and 6:00 p.m.

FIG. 16 is a schematic representation of the sprinkler and drip control systems during 6:00 a.m. and 6:00 p.m.

FIG. 17 is a schematic diagram of the sprinkler and drip control systems used in conjunction with a manual sprinkler switch.

FIG. 18 is a diagram of the sprinkler and drip control systems used in conjunction with a temperature regulator.

FIG. 19 is schematic representation of the backwashing of a first filter.

FIG. 20 is a schematic representation of the backwashing of a second filter.

FIG. 21 is a schematic representation of the solenoid valve system during normal operation.

FIG. 22 is a schematic representation of the solenoid valve system used in conjunction with a manual filter switch.

DETAILED DESCRIPTION OF A PREFERRED EMBODIMENT

Figure 7:
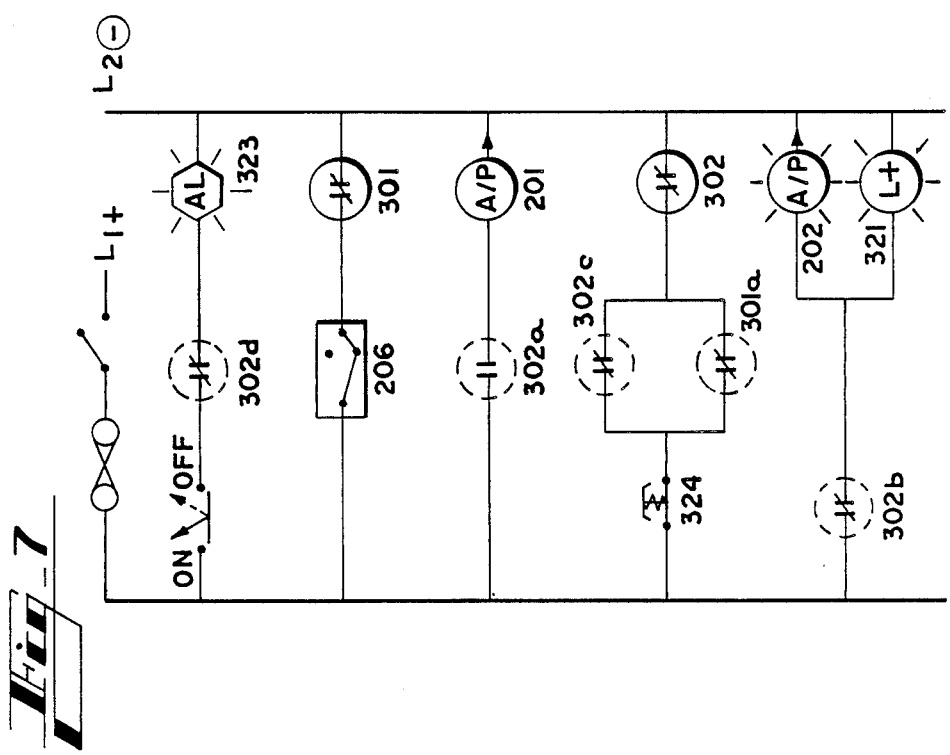
FIG. 7 is a schematic diagram of what occurs when the main air pump malfunctions.

It will be understood that the following Description of a Preferred Embodiment is a description of only one exemplary embodiment of the present invention. The following Description of a Preferred Embodiment is not intended to be an exhaustive description of all of the alternative embodiments of the present invention, and it will be understood that the scope of the present invention and the alternative embodiments encompassed thereby is limited only by the appended claims.

As shown in FIG. 1, a general representation of a preferred embodiment is shown. Sewage and waste water flows out of a building 10 through underground pipes 20 and into and through an underground sewage tank 100. The waste water is clarified (by a process which will be further discussed below) before it reemerges from the underground sewage tank 100 (shown in FIGS. 2 and 3) by means of a pipeline 223, travels through a pump system 200 (schematically depicted in FIG. 4) and finally enters a sprinkler system, a drip irrigation system, or some other recycling system. Various components in the control box 300, schematically depicted in FIG. 5, determine when the above processes occur.

Specifically, as can be seen in FIG. 2, the waste water traveling through pipe 20, first enters an aeration chamber 110 in the underground sewage tank 100. Air flows from an air pump 201 or 202 located inside the pump unit 200 through an air line 221 into this aeration chamber 110 of the underground sewage tank 100. The air circulates the waste water and holds any solid materials in suspension. Additionally, the aeration of the waste water by the air pump 201 or 202 promotes the growth of aerobic bacteria which are responsible for the decomposition of the solid sewage material.

Alternatively, as seen in FIG. 3, once the water leaves the first aeration zone 110a, it then enters a second aeration zone 110b, where further aerobic decomposition occurs. Both aeration zones 110a and 110b are aerated by means of an air line 221.

Figure 6:
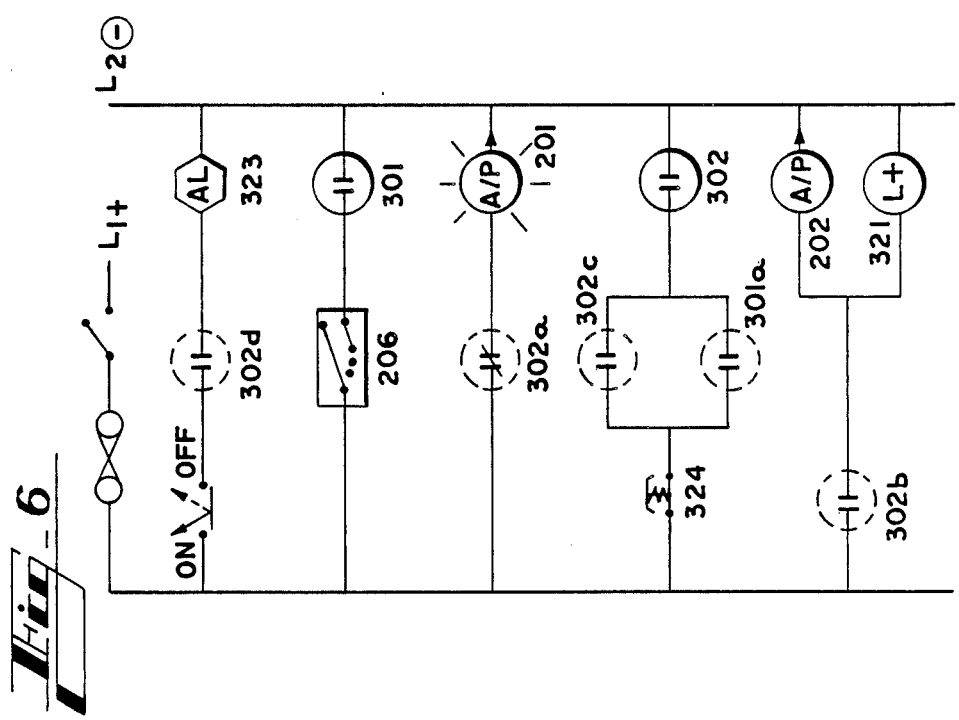
FIG. 6 is a schematic diagram of an air pump operating normally.

Given the importance of having constant aeration in the aeration chamber 110 or 110a and 110b, a back-up air pumping system has been designed. FIG. 6 depicts the situation in which the main air pump 201 is operating normally. In such a situation, the main air pump 201 is operating normally via closed slave control relay 302a. Furthermore, since there is pressure in the line 221 due to the fact that the main air pump 201 is operating normally, the pressure switch 206 located inside the pump unit 200 is open. Since current cannot get through the open pressure switch 206, control relay 301 is not activated. Additionally, power runs through the reset switch 324, but in the normal operation state, cannot reach control relay 302 because both slave control relay 302c and slave control relay 301a are in their open positions. Accordingly, in its normal state, control relay 302 is open. Lastly, current is not able to reach the light 321 or the auxiliary air pump 202 since, during normal operation, control relay 302b is in an open position.

As seen in FIG. 7, in the event that the main air pump 201 malfunctions, the following events occur. The air pressure in the line 221 drops and the pressure switch 206 closes. Accordingly, current flows through the closed pressure switch 206 and is able to reach the control relay 301. The activation of control relay 301 causes the slave control relay 301a to close. This in turn allows the current which flows through the reset switch 324 to continue through control relay 301a so as to activate control relay 302. When control relay 302 is activated it closes the slave control relay 302c. The closing of slave control relay 302c, locks control relay 302 into a closed position. Additionally, the activation of control relay 302 causes the slave control relay 302d to close. Accordingly, current flows through the manual alarm switch 331, continues through control relay 302d and activates the alarm 323, causing it to sound. Also, the activation of control relay 302 causes the slave control relay 302a, which is normally in a closed position, to open thereby preventing any current from flowing to the main air pump 201. Additionally, the activation of control relay 302 causes slave control relay 302b to close thereby allowing current to flow into the auxiliary air pump 202 and the light 321 which is located in the control box.

As is depicted in FIG. 8, when the auxiliary air pump 202 begins pumping air into the aeration chamber 110 or 110a and 110b, the air pressure in the line 221 builds up and automatically resets the pressure switch 206. Remember that the pressure switch 206 is open when there is air pressure in the line. Accordingly, no current gets through to control relay 301 once this occurs. When control relay 301 is deactivated, the slave control relay 301a is opened. However, because slave control relay 302c remains closed, control relay 302 is locked into an activated position.

Also, as seen in FIG. 8, in order to disengage the alarm 323, the customer must open the control box 300 and turn the manual alarm switch 331 into its off position. This breaks the circuit so that no current is allowed to travel through the still closed slave control relay 302d. Accordingly, the alarm 323 is silenced. The customer must then call a repairman by dialing the telephone number provided in the control box 300.

Following the repair of the main air pump 201, the repairman resets the entire air pump system by hitting the manual reset switch 324. This prevents any current from flowing through the slave control relay 302c which accordingly deactivates control relay 302. The deactivation of control relay 302 triggers the closing of slave control relay 302a and allows current to flow to the main air pump 201 as was shown in FIG. 6.

Simultaneously, the deactivated control relay 302 opens slave control relay 302b thereby preventing the current from traveling to the auxiliary pump 202 and the light 321. Additionally, the deactivation of control relay 302 opens slave control relay 302d so as to disarm the alarm 323. Once this occurs, the manual alarm switch 331 is returned to its "on" position which allows current to run up to open slave control relay 302d, thereby placing the alarm 323 in the normal operating mode.

As seen in FIGS. 2 and 3, once the water leaves the aeration zone 110 or 110b, it then enters a clarifier chamber 120. In the clarifier chamber 120, the microorganisms and the majority of the remaining solid particles settle to the bottom of the clarifier chamber 120. In the first preferred embodiment, depicted in FIG. 2, the wall 130 of the clarifier chamber 120 located opposite the wall 140 between the aeration chamber 110 and the clarifier chamber 120 slants at the bottom toward the aeration chamber 110. This slant, along with the circulating water in the aeration chamber 110, encourage the settled micro-organisms and solid particles back into the aeration chamber 110 where further breakdown will occur.

As shown in FIGS. 2 and 3, the clear water at the top of the clarifier chamber 120 then falls into a third chamber, called the holding tank 150. As shown in FIGS. 2, 3 and 4, the water level in the holding tank 150 is monitored by means of an air line 222. The information regarding the pressure in the air line 222 (which varies directly with the water level in the holding tank 150) is conveyed to pressure switches 207, 208 and 209. It is the function of these pressure switches 207, 208 and 209 to either turn the hydraulic pump 203 on or off.

FIG. 9 schematically depicts hydraulic pumps 203 and 204 when they are not in operation. As shown in FIG. 10, once the pressure in the air line 222 rises to a certain level (in this particular instance, we will assume this certain level is set at 1.5 pounds per square inch, which corresponds to approximately 48 inches of water in the holding tank 150), the high pressure switch 207 closes so that current is able to flow through closed slave control relay 303a, through the high pressure switch 207 so as to activate control relay 303, control relay 317 and control relay timer 310.

As seen in FIG. 10, the activation of control relay 303 causes slave control relay 303a to open. Simultaneously, the activation of control relay 310 causes slave control relay 310a to close for a certain period of time (in this case, we will assume 3 seconds). The activation of control relay 303 also causes slave control relay 303b to close. The closing of slave control relay 303b allows electricity to flow through slave control relay 303b, through closed slave control relay 311a and thereby powers low pressure switch 208, which in turn keeps control relay 303, control relay 317, and control relay timer 310 in their activated states. Notice that this is the case even though power will not be able to reach these three control relays via the first pathway involving slave control relay 310a and the high pressure switch 207 once slave control relay 310a opens after it has remained closed for a specific period of time (in our case, three seconds).

Additionally, the activation of control relay 303 causes slave control relay 303d to close and in turn activates the time delay control relay 307. The activation of control relay 307 causes slave control relay 307a to remain open for a certain period of time (in this particular case, ten seconds) before closing. This ten second delay allows the hydraulic pressure to build up before a pressure switch 210, which measures the pressure in the water line between the hydraulic pump 203 and the sprinkler or drip system, is armed. The activation of control relay 303 also causes slave control relay 303e to close, which in turn starts the main hydraulic pump 203. Once the main hydraulic pump 203 begins to operate, water is pumped through a check valve 205 and into the drip or sprinkler system. Accordingly, the hydraulic pressure increases. This increase in hydraulic pressure resets the pressure switch 210 so that it is now in an open state. Notice that the alarm is inoperative because, even though the alarm switch 331 is in the "on" position, slave control relay 305a is still open. After the ten second time delay, slave control relay 307a closes and arms the pressure switch 210. Additionally, the activation of control relay 303 causes slave control relay 303c to close. The drip irrigation system is installed in the soil below the frost line in order to permit efficient distribution and absorption of treated effluent in a limited area when the surface soil is frozen.

Lastly, as seen in FIGS. 10, 19, 20, 21, and 22, the activation of control relay 317 causes slave control relay 317a to close and thereby activates control relay 318. Control relays 317 and 318 will be further discussed below.

As shown in FIG. 11, in the event that the main hydraulic pump 203 malfunctions, the output hydraulic pressure would decrease so as to cause the pressure switch 210 to close thereby activating control relay 304. The activation of control relay 304 causes slave control relay 304a to close thereby activating control relay 305. The activation of control relay 305 causes the following reactions to occur simultaneously. (1) Slave control relay 305b is opened and therefore the main hydraulic pump 203 is deactivated. (2) Slave control relay 305a closes and activates the alarm 323 (3) Slave control relay 305c closes and activates the auxiliary hydraulic pump 204, powers the light 322 located in the control box 300 and closes solenoid valve 227 which normally remains open so that water is only pumped through a single color-coded "alarm" sprinkler 400. (4) Slave control relay 305d closes and locks in control relay 305.

The customer goes to the control box 300 and turns off the alarm switch 331, thereby deactivating the alarm 323. Next, the customer calls a repairman at the telephone number provided in the control box 300. Following the repair of the main hydraulic pump 203, the service man resets the system by pressing the reset switch 324. Accordingly, control relay 305 opens; slave control relay 305b closes and starts the main hydraulic pump 203; slave control relay 305c opens and deactivates the auxiliary hydraulic pump 204 and the light 322; and, slave control relay 305a opens and deactivates the alarm 323. After the alarm switch 331 is returned to its "on" position, the system is reset for normal pumping operation, as was seen in FIG. 10.

The present invention enables the user to select whether the water leaving the holding tank 150 will be dispensed through a sprinkler system, through a drip feed irrigation system, or through some other type of recycling system. Additionally, the present invention enables the user to select when a particular system is activated.

In order to avoid interference with daytime activities, it is assumed that most users would want to use the sprinkler system at night. This, however, presents a potential problem since water usage is at its lowest level during the evening and nighttime hours. To overcome this obstacle, the present invention allows the user to reset the system so as to stop pumping at a higher low water level than is normally used. For instance, the normal "low-low" water level might be two inches of water in the holding tank 150; whereas, the "high-low" water level might be forty inches of water.

Assume that the user wants to sprinkle his lawn between 5:00 a.m. and 6:00 a.m. In order to successfully do this, a timer 320 would switch the pumping system to the "high-low" water level at 6:00 p.m. every afternoon so that enough water would be present in the holding tank 150 for the early morning sprinkling. At 5:00 a.m., the timer 320 would automatically put the system into the sprinkler mode. The system would continue in the sprinkler mode until 6:00 a.m., at which time the timer 320 would reset the system to the normal drip mode and the "low-low" water level configuration.

FIGS. 12 through 18 are schematic illustrations of how such a system would operate. First as seen in FIG. 12, at 6:00 p.m., the timer 320 would cause slave control relay 320a to close thereby activating control relay 311. As seen in FIG. 13, the activation of control relay 311 would cause slave control relay 311a to open, thereby opening and cutting off power to the low-low water level pressure switch 208. Additionally, the activation of control relay 311 would cause slave control relay 311b to close. This closing of slave control relay 311b would allow current to run through slave control relay 303b, through closed slave control relay 311b, through closed slave control relay 306d, so as to arm the "high-low" pressure switch 209. Accordingly, this system operates in the drip mode between the high water level of forty-eight inches and the "high-low" water level of forty inches until 5:00 a.m.

As depicted in FIG. 14, at 5:00 a.m., timer 320 causes slave control relay 320b to close and energize control relay 306. The activation of control relay 306 causes slave control relay 306a to open, thereby deactivating and shutting the drip solenoid valve 217. Simultaneously, the activation of control relay 306 causes slave control relay 306b to close thereby energizing and opening the sprinkler solenoid valve 218. As depicted in FIG. 15, the activation of control relay 306 simultaneously closes slave control relay 306c thereby arming pressure switch 208 and also opens slave control 306d thereby de-energizing pressure switch 209. Accordingly, the system now operates between the high water level (forty-eight inches) and the "low-low" water level (two inches). Lastly, the activation of control relay 306 causes slave control relay 306e to close so as to activate control relay 314. (Slave control relay 306e and control relay 314 will be further discussed below.) The system is now in the sprinkler mode.

The system continues in the sprinkler mode until 6:00 a.m. when, as can be seen in FIG. 16, the control relay timer 320 opens both slave control relay 320a and slave control relay 320b. Accordingly, both control relay 311 and control relay 306, respectively, are de-energized at this time. This deactivation of the two control relays, 311 and 306, causes slave control relay 306a to close thereby opening solenoid valve 217 and causes slave control relay 306b to open thereby de-energizing and closing the sprinkler solenoid valve 218. The deactivation of control relay 311 and control relay 306 keeps the system operating between the high water level (forty-eight inches) and the "low-low" water level (two inches) until 6:00 p.m.

Notice that there is a manual sprinkler switch 325 located in the control box 300 which allows the user to override the automatic timing mechanism described above so as to activate the sprinkler mode of the system at any time it is desired As seen in FIG. 17, this occurs because the current is allowed to flow through the manual sprinkler 325 so as to activate control relay 306. Accordingly, slave control relay 306a is opened thereby deactivating and shutting drip solenoid valve 217 and, slave control relay 306b is closed thereby activating and opening sprinkler solenoid valve 218.

Another feature contained within this invention is a temperature switch 332 which keeps the system in the drip mode once the outdoor temperature drops to a certain level. This feature is important since it would be impossible to operate in the sprinkler mode of the system if the temperatures were below freezing. As seen in FIG. 18, the temperature switch 332, which is normally in a closed position, simply opens when the temperature reaches a certain low thereby preventing the activation of control relay 306. Accordingly, the system remains in its normal drip mode.

In an effort to further purify the water being pumped by the hydraulic pump 203, various filtering systems can be employed. For instance, as seen in FIG. 4, two filters 219 and 220 have been installed. In order to keep these filters 219 and 220 clean, they must periodically be backwashed, In the present invention, each filter gets backwashed every time the hydraulic pump 203 is activated by the closing of the high water level pressure switch 207. Backwashing is usually carried out in the drip mode of the invention, but can also be carried out when the system is set in the sprinkler mode.

As the water level rises in the holding tank 150, it closes the "low-low" water level pressure switch 208 and then closes the "high-low" water level pressure switch 209. When the high water level is reached in the holding tank 150, the high water level pressure switch 207 closes and starts the hydraulic pumping operation which was discussed above. As was seen earlier in FIG. 10, once the high water level is reached and the high water level pressure switch 207 is closed, control relay 317 is activated. As depicted in FIG. 19, the activation of control relay 317 causes slave control relay 317b to close and energize control relay 308. The activation of control relay timer 308 initiates a one minute positive backwash cycle. Note that this one minute time period has been arbitrarily selected and that other time periods can be programmed depending upon the backwashing needs. Additionally, the activation of control relay 317 simultaneously causes slave control relay 317c to open; causes slave control relay 317d to open; causes slave control relay 317e to close; and, causes slave control relay 317a to close which in turn energizes control relay 318.

The activation of control relay 318 causes slave control relay 318a to open; causes slave control relay 318b to open; causes slave control relay 318c to close; and causes slave control relay 318d to close. As seen in FIG. 19, as a result of the above occurrences, solenoid valves 212 and 215 are energized and solenoid valves 211, 213, 214 and 216 are de-energized. Accordingly, as seen in FIG. 4, water flows from the hydraulic pump 203 through solenoid valve number 212, through filter 219, and then back through filter 220, through valve 215, and back through pipe 226 into the aeration chamber 110 or 110a of the underground sewage tank 100. In this method, any debris which may have collected on filter 220 is removed and returned to the aeration chamber 110 or 110a for further decomposition.

As seen in FIG. 20, after one minute, slave control relay 308a closes and thereby allows current to activate control relay timer 309. The activation of control relay timer 309 initiates a one minute time period for the negative backwash of filter 219. Simultaneously, slave control relay 308b closes and activates control relay 312. The activation of control relay 312 causes slave control relays 312a and 312b to open thereby deactivating solenoid valves 212 and 215, respectively. Additionally, the activation of control relay 312 causes slave control relays 312c and 312d to close thereby activating solenoid valves 211 and 214, respectively. Accordingly, as is seen in FIG. 4, water flows from the hydraulic pump 203 through valve 211, through filter 220 counter clockwise through filter 219 and then through solenoid valve 214 and is carried back by pipe 226, along with any debris which had collected on filter 219, to the aeration chamber 110 or 110a of the underground sewage tank 100.

After the second one minute time period, the backwashing of both filters 219 and 220 is complete. As depicted in FIG. 21, it is at this time that slave control relay 309a opens thereby deactivating control relay 312. The deactivation of control relay 312 causes slave control relay 312c to open; slave control relay 312a to close; causes slave control relay 312d to open; and, causes slave control relay 312b to close. Additionally, once the second one minute time period has ended, slave control relay 309b closes thereby activating control relay 313. The activation of control relay 313 causes slave control relay 313a to close, thereby energizing latch relay 319. The activation of latch relay 319 in turn causes slave latch relay 319a to close. The closing of slave latch relay 319a allows power to activate control relays 315 and 316.

The activation of control relay 315 causes slave control relay 315a to open thereby preventing any power from getting to control relays 308 and 309. Simultaneously, the activation of control relay 315 causes slave control relay 315b to close. The closing of slave control relay 315b acts as a backup to slave control relay 319a to ensure that control relays 315 and 316 remain activated. Also, due to the activation of control relay 315, slave control relay 315c, as well as, slave control relay 315d are closed thereby allowing current to flow through and open solenoid valves 211 and 212. Lastly, the activation of control relay 315 causes slave control relay 315e to open.

The activation of control relay 316 causes slave control relay 316a to open thereby preventing solenoid valves 214 and 215 from opening. Additionally, the activation of control relay 316 causes slave control relay 316b to close thereby allowing current to activate solenoid valve 213 causing it to open.

In sum, after the backwashing of both filters 219 and 220 is complete, solenoid valves 211, 212 and 213 are open allowing the purified water to flow freely into either the drip or sprinkler system, and solenoid valves 214, 215 and 216 are closed. This is the normal pathway taken by the water leaving the home sewage treatment system when filtering is desired.

Latch relay 319b is reset when the low water level is reached. This occurs because control relay 317 is deactivated, thereby causing slave control relay 317c to close. The closing of slave control relay 317c allows current to flow into the latch relay reset 319b thereby resetting it.

As can be seen in FIG. 22, the manual filter switch 333 located in the control box 300 gives the user the option of not filtering the water being pumped out of the holding tank 150. To do this, the user flips the manual filter 333 into the "on" position. This allows current to flow through and activate control relay 314. In turn, this causes slave control relay 314a to close thereby activating and opening solenoid valve number 213. The activation of control relay 314 simultaneously causes slave control relay 314b to close and open solenoid valve number 216. Also, the activation of control relay 314 causes slave control relay 314c to open thereby preventing power from getting to solenoid valves 211 and 212. Accordingly, solenoid valves 211 and 212 are in their closed positions. Lastly, the activation of control relay 314 causes slave control relay 314d and slave control relay 314e to open. In this manner, as can be seen in FIG. 4, the water flows directly from the hydraulic pump 203 in a straight line through solenoid valves number 216 and number 213, and then directly into either the drip or the sprinkler mode of the system. Notice that by selecting the "automatic" mode on the manual filter switch 333, the system returns to normal and the water flows through filters 219 and 220 when in the drip mode.

As is depicted in FIGS. 14 and 17, when the system is operating in the sprinkler mode, the water is not being filtered. This occurs because once control relay 306 is activated, it causes, among other things, slave control relay 306e to close, thereby activating control relay 314. The activation of control relay 314 causes the events described above with regard to FIG. 22 to occur, thereby by-passing the filtering process. Notice that the system can be designed to filter while in the sprinkler mode simply by removing control relay 306e.

Also notice that systems other than the dual filtering system described above can be used. For instance, a system having only one filter 220 could be used in conjunction with smaller underground sewage tanks 100. With such a system, backwashing would occur just as described above with regard to FIG. 19, but, obviously, there would be no filter 219 or solenoid valve 214. Additionally, a single, automatic-backwashing filter could be used in conjunction with industrial size underground sewage tanks 100.

Regardless of the type of filtering system used, once the water in the holding tank 150 reaches the selected low level, the appropriate low pressure switch 208 or 209 is closed. This causes control relay 303; control relay 317; slave control relay 317a; control relay 318; and, control relay 310 all to open. This causes the "low-low" pressure switch 208 and the "low-high" pressure switch 209 to go off line and reset the high pressure switch 207 on line. Note that now all pressure switches are open. The whole cycle will then repeat when the water level in the tank reaches the high level and activates the high pressure switch 207.

It will be understood by those skilled in the art that the foregoing Description of a Preferred Embodiment has not been exhaustive of the various alternative embodiments of the present invention, and has been merely illustrative and exemplary of the preferred embodiment of the present invention. It will also be understood that additional embodiments clearly fall within the spirit and scope of the present invention, and that the present invention is limited solely by reference to the appended claims.

What I claim is:

1. A sewage treatment system comprising:
an underground sewage tank connected to receive waste water;
the sewage tank including a treatment chamber receiving and treating the waste water to produce effluent, and a holding tank receiving and holding treated unfiltered effluent from the treatment chamber;
means in the holding tank responsive to the level of effluent therein;
a pump having an inlet in communication with the underground holding tank to withdraw unfiltered effluent therefrom;
drip feed irrigation distribution means located below ground and receiving the pumped effluent so as to disseminate the effluent into the ground;
pump control means responsive to the means in the holding tank to actuate the pump when said effluent level reaches a predetermined high level;
filter means selectively connected between the pump outlet and the irrigation distribution means so that effluent pumped from the holding tank to the irrigation distribution means passes through the filter means in a forward direction, whereby the filter means entraps particulate matter in the effluent;
backwash valve means operatively connected to said pump and selectively operative to cause effluent from the pump outlet to flow through the filter means in a reverse direction to backwash the filter means, thereby removing particulate matter previously entrapped in the filter means; and
means receiving the backwashing effluent and extending to the treatment chamber of the underground sewage tank and returning to the treatment chamber the backwashing effluent and particulate matter removed from the filter means.

2. Apparatus as in claim 1, wherein said drip feed irrigation distribution means is installed below the frost level in order to permit efficient distribution and absorption of treated effluent in a predetermined area under conditions in which the surface soil is frozen.

3. Apparatus as in claim 1, wherein:
the means in the holding tank comprises a pipe having a first end extending below the level of effluent in the holding tank;
the pipe extending to a second end located aboveground so that the air pressure within the pipe and present at the second end is responsive to the level of effluent in the holding tank; and the pump control means comprises
pressure sensing means located aboveground and responsive to the air pressure at the second end of the pipe to actuate the pump when the sensed air pressure corresponds to a certain high level of effluent within the holding tank.

4. Apparatus as in claim 3, further comprising:
backwash control means operative in response to the pump control means to momentarily operate the backwash valve means whenever the pump is actuated, so that the filter means undergoes an automatic backwash each time the pump withdraws effluent from the holding tank,
whereby the filter means does not become clogged through use in successive operations of the pump to withdraw effluent from the holding tank.

5. Apparatus as in claim 1, further comprising:
sprinkler irrigation means located aboveground;
valve means receiving the pumped effluent and selectively operative to connect the pumped effluent to the aboveground sprinkler means or to the underground drip feed irrigation means; and
timer means operative to control the valve means so as to connect the aboveground sprinkler means to receive the pumped effluent at certain times of day and to connect only the underground drip feed irrigation means to receive the pumped effluent at other times of day,
so that operation of the pump cannot cause irrigation to occur aboveground during said certain times.

6. Apparatus as in claim 5, wherein:
the timer means includes mode control means selectively operative at predetermined times either to a sprinkler mode or to a drip mode of disseminating the pumped effluent;
the means responsive to the level of effluent in the holding tank is responsive to the mode control means to provide a first low-level signal corresponding to a predetermined minimum amount of effluent when the drip mode is selected, and to provide a second low-level signal corresponding to a greater minimum amount of effluent when the sprinkler mode is selected, so that a relatively greater minimum amount of effluent accumulates in the holding tank when in the sprinkler mode; and
the timer means is operative to start the pump and connect the valve means to the sprinkler means during said certain time of day in the sprinkler mode, and is operative during the drip mode to connect the valve means to the drip feed distribution means and return starting and stopping operation of the pump to the effluent level responsive means.

7. Apparatus as in claim 5, further comprising:
means responsive to temperature aboveground and operative to prevent the dissemination of pumped effluent through the aboveground sprinkler irrigation means whenever the temperature is below a certain temperature selected to prevent damaging the sprinkler irrigation means due to freezing.

8. Apparatus as in claim 1, wherein:
the pump is located aboveground and has said inlet connected to a pipe extending to the underground holding tank.

9. Apparatus as in claim 1, wherein:
the pump control means and the pump are located aboveground so as to be located outside the sewage tank.

* * * * *